Dec. 20, 1927.

L. D. SOUBIER 1,653,477

MEANS FOR CONVEYING MOLTEN GLASS TO MOLDS

Filed April 10, 1922   3 Sheets-Sheet 1

INVENTOR
LEONARD D. SOUBIER
BY J. F. Rule
HIS ATTORNEY

Dec. 20, 1927. 1,653,477
L. D. SOUBIER
MEANS FOR CONVEYING MOLTEN GLASS TO MOLDS
Filed April 10, 1922    3 Sheets-Sheet 2
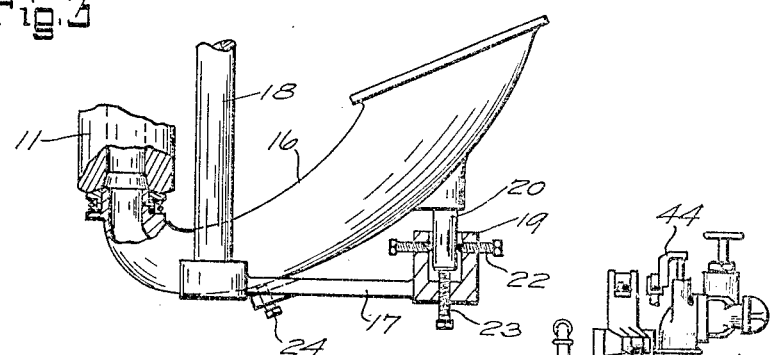
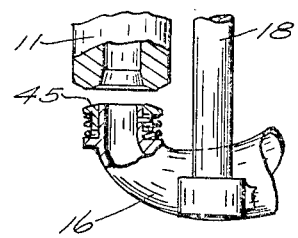
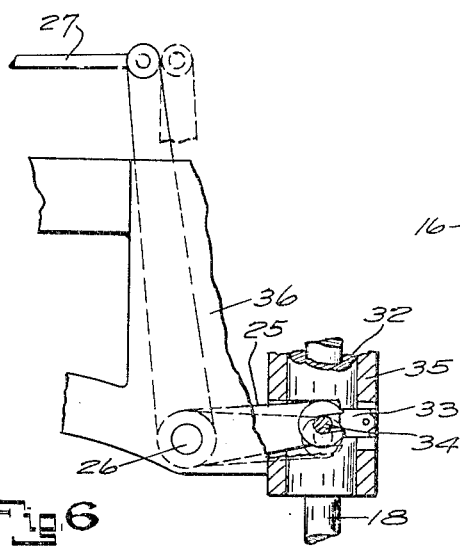
INVENTOR
LEONARD D. SOUBIER
BY J.F. Rule
HIS ATTORNEY Dec. 20, 1927.

L. D. SOUBIER 1,653,477

MEANS FOR CONVEYING MOLTEN GLASS TO MOLDS

Filed April 10, 1922     3 Sheets-Sheet 3

INVENTOR
LEONARD D. SOUBIER
BY J. F. Rule
HIS ATTORNEY

Patented Dec. 20, 1927.

1,653,477

UNITED STATES PATENT OFFICE.

LEONARD D. SOUBIER, OF TOLEDO, OHIO, ASSIGNOR TO THE OWENS BOTTLE COMPANY, OF TOLEDO, OHIO, A CORPORATION OF OHIO.

MEANS FOR CONVEYING MOLTEN GLASS TO MOLDS.

Application filed April 10, 1922. Serial No. 550,952.

My invention relates to means for introducing charges of molten glass into molds. An object of the invention is to provide a practical device for receiving individual masses or charges of glass and introducing them into a mold through the lower open end thereof.

At the present day, it is customary to drop such charges into a mold open at its upper end. In machines for making bottles or other narrow necked ware, the parison mold is in inverted position, that is, neck end downward, when it receives its charge, as it is impractical or impossible to drop the charge through the neck end of the mold. Later the parison is inverted and introduced into the finishing mold. By the present invention I provide suitable means for introducing individual masses or gobs of glass through the lower ends of the parison molds, so that inverting of the parisons becomes unnecessary.

Other features of the invention will appear hereinafter.

In the accompanying drawings:

Figure 3 is an elevation of such device in operative relation to the mold.

Figure 4 is a fragmentary view showing the transfer device moved downward out of engagement with the mold.

Figure 5 is a front elevation of a portion of the glass blowing machine and an attached transfer device.

Figure 6 is a fragmentary view of mechanism for lifting and lowering the transfer device.

Figure 1:
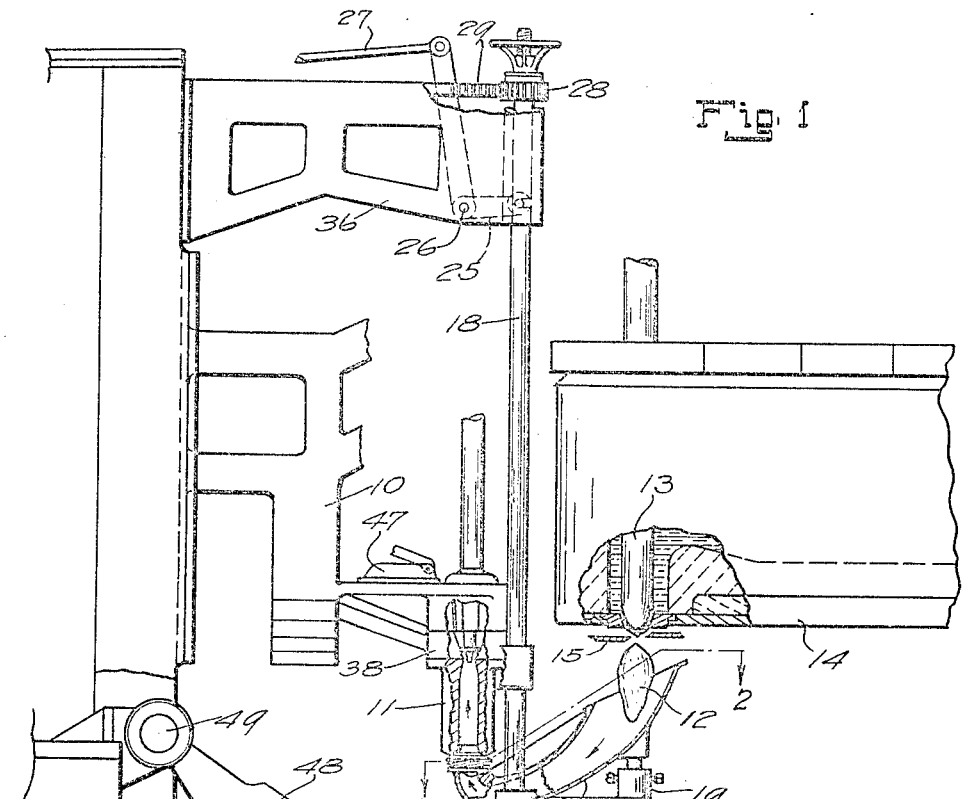
Figure 1 is a part sectional elevation of a glass blowing machine, a feeder and means for receiving the charges of glass from the feeder and transferring them to the parison molds.

In Figures 1 to 6 inclusive, I have shown my invention as applied to a glass blowing machine of the Owens type of construction. Such a machine is shown, for example, in the patent to La France, Number 1,185,687, June 6, 1916.

The blowing machine comprises a mold carriage 10 which rotates continuously about a vertical axis. Parison or blank molds 11 are mounted on the carriage to rotate therewith. Charges or gobs 12 of molten glass are supplied by a feeder which may be of any approved form. As herein shown, the feeder is of a well known type comprising a plunger 13 which reciprocates vertically over the outlet opening of a receptacle 14 to control the discharge of glass. The charges are severed by shears 15 operating in synchronism with the plunger 13.

The gob 12 when severed drops into a funnel-shaped tube or transfer device 16 through which it is conveyed en masse to the mold 11. This tube is substantially U-shaped or curved so that both its receiving end and discharge end face upward, the discharge end being directly opposite and beneath the lower open receiving end of the mold 11. The walls of the tube are flared outwardly toward the receiving end, and the mouth of the tube may be elongated in the direction of its travel to increase the length of time it is in charge receiving position as it travels past the feeder.

The tube 16 is mounted on a horizontal rock arm 17 fixed to the lower end of a vertical shaft 18 which is mounted for vertical movement and also for rotation about its own axis. The arm 17 is provided with a socket 19 to receive a stem 20 on the tube 16. Set screws 22, 23 and 24 provide for horizontal, vertical and angular adjustments of the tube 16 and permit it to be accurately adjusted to the molds.

When a charge of glass is being introduced into a mold 11, the tube 16 is in engagement therewith, as shown in Figures 1 and 3. After the glass has entered the mold, the shaft 18 moves downward to separate the tube from the mold and is then rocked to swing the tube from the full line position (Fig. 2) to the dotted line position to avoid interference with the finishing mold and other parts of the machine. The shaft 18 is moved up and down by a bell crank 25 pivoted at 26 and having connections, including a link 27, with an operating cam (not shown) on the machine. The rotative movements of the shaft 18 are effected by means of a pinion 28 and rack 29, the latter having operating connections with a cam on the machine. The connection between the bell crank 25 and shaft 18, as shown in Figure 6, comprises a bushing 32 to which the shaft is connected for up and down movement, and a collar 33 having lugs 34 engaged by the bell crank lever. The bushing 32 is slidably mounted in a sleeve 35 formed on a bracket 36 on the machine carriage.

The mechanism just described for operating the shaft 18 may be the same as the mechanism for operating the knife arm disclosed in the La France patent above mentioned and shown in detail in Figure 16 of said patent.

A neck mold 38 is provided as usual in register with the blank mold 11. When a charge of glass 12 is dropped into the transfer tube, the air is exhausted from the blank mold through the neck mold, thereby assisting in drawing the glass through the tube into the mold and also operating to form the neck of the bottle or other article and compact the charge of glass in the mold. That is to say, when the charge is dropped into the tube 16 and suction applied through the mold, the air pressure behind the glass forces it quickly into the mold, the pressure being sufficient to form the neck of the bottle. The exhaustion of the air may commence about the time the gob 12 reaches the horizontal portion of the tube, the latter being restricted at this point to such an extent that the glass preferably forms a seal and prevents the air from being drawn through the tube past the glass.

The air exhaustion is controlled by a valve 40 (Fig. 5) in a vacuum chamber 41 directly above and communicating with the neck mold cavity. A vacuum pipe 42 extending vertically from the chamber 41 is connected to any suitable source of air exhaustion. The valve 40 is carried by a stem 43 extending through the pipe 42. A cam actuated lever 44 at the upper end of the stem 43 operates at the proper time to lower said valve and permit the air to be exhausted from the mold as above described. The means for operating the valve 40 and for applying suction to the blank mold may be the same as in the Owens machines, and fully set forth in the La France patent hereinbefore mentioned.

Figure 2:
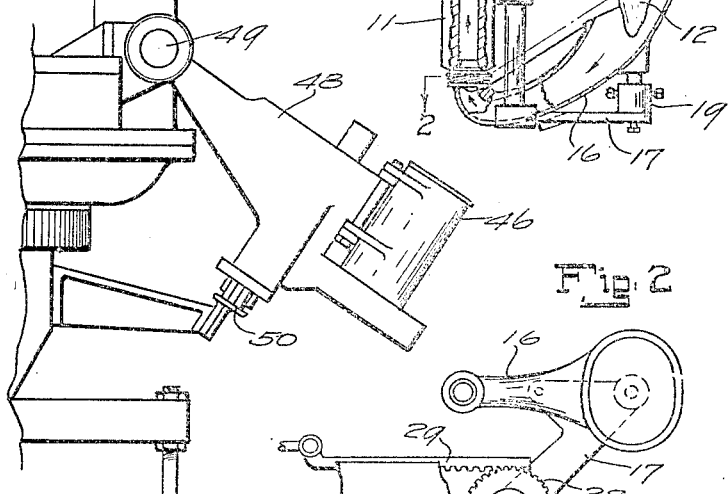
Figure 2 is a plan view of the transfer device.

Before the charge of glass is dropped into the funnel the latter is moved upward into engagement with the blank mold, as shown in Figures 1 and 3. In order to form an air tight seal between the funnel and the mold, a spring actuated gasket or collar 45 is provided on the end of the funnel and bears against the lower end of the mold. After the charge has entered the mold the rod 18 is lowered, separating the funnel from the mold, as shown in Figure 4. Said rod is then rotated to swing the funnel from the full line to dotted line position (Fig. 2).

The blank mold 11 may now be opened in the usual way and a finishing mold 46 brought into position to enclose the blank, after which a blowing head 47 is moved into position and the parison blown to its final form. The finishing mold, as shown, is carried on an arm 48 pivoted at 49 to the mold carriage, said arm supported and traveling on a cam track 50 shaped to swing the mold upward at the proper time.

It will be understood that although a single funnel 16 and a single set of molds have been described, the machine will ordinarily comprise a number of such sets of molds and a corresponding number of funnel guides symmetrically arranged about the vertical axis of the mold carriage. It will be understood that the operation of the feeder plunger 13 and knives 15 are synchronized with the movements of the mold carriage, so that a charge of glass is severed and dropped into each funnel while passing beneath the feeder.

Figure 7:
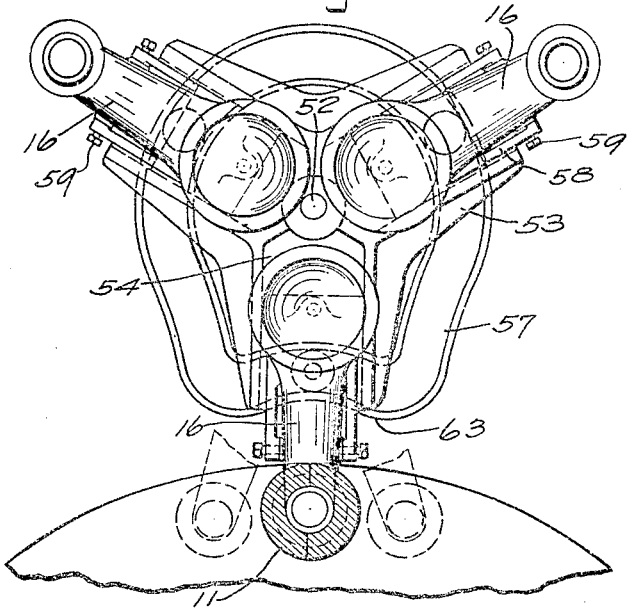
Figure 7 is a plan view of a modified construction in which transfer tubes are mounted separately from the glass blowing machine.
Figure 8:
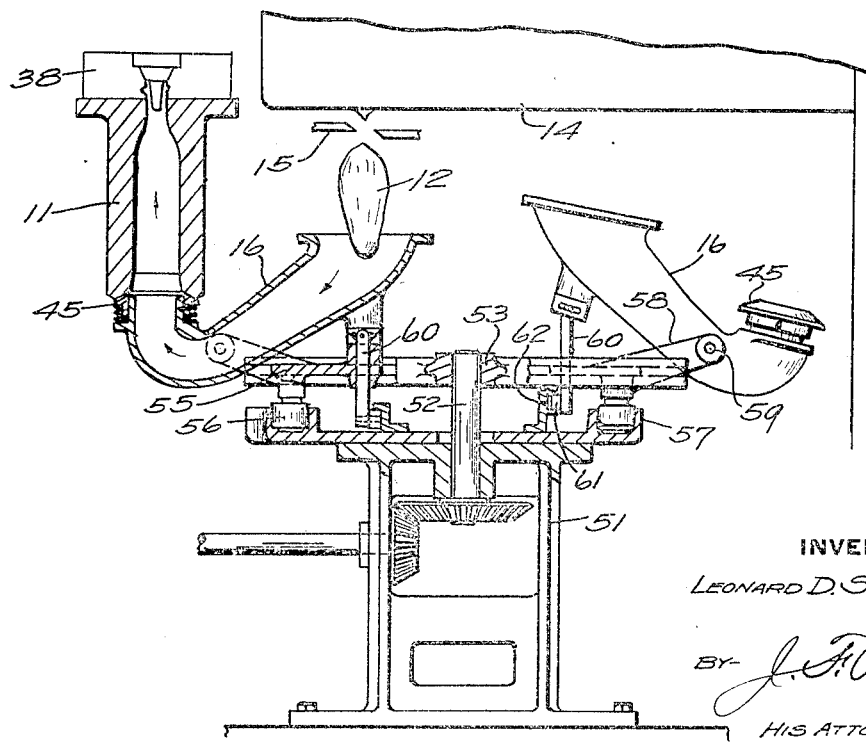
Figure 8 is a sectional elevation of the same.

Figures 7 and 8 illustrate a modification in which the funnel guides 16 are mounted on a support separate from the mold carriage. This support comprises a stationary standard or frame 51 in which is journalled a continuously rotating shaft 52. This shaft is geared to be driven in synchronism with the rotation of the mold carriage. A spider 53 fixed to the shaft 52 is formed with radially disposed guideways 54 in which are slidably mounted heads 55 carrying cam rolls 56 running in a stationary cam track 57 supported on the standard 51. Arms 58 on the heads 55 are connected by pivots 59 to the funnel guides. The funnels are tilted about the fulcra 59 by means of rods 60 connected at their upper ends to the funnels and at their lower ends provided with cam rolls 61 running in a cam groove 62. The rods 60 are mounted for vertical sliding movement in the heads 55.

The operation of the mechanism shown in Figures 7 and 8 is as follows:

The spider 53 rotates continuously and brings the receiving ends of the funnels successively into receiving position beneath the discharge orifice of the feeder. The shears operate to sever and drop a gob 12 into each funnel when in such position. The cam 57 is formed with a reentrant portion 63 so shaped that the discharge end of the funnel will travel with the mold 11 for some distance. Shortly before the funnel receives the charge of glass the cam 62 operates to swing the funnel about its fulcrum 59 and move the discharge end of the funnel upward into engagement with the mold. After the charge has entered the mold, the cam 62 operates to lower the funnel from the mold.

Modifications may be resorted to within the spirit and scope of my invention.

What I claim is:

1. The combination of a mold open at its lower end to receive a charge of glass, means to separate an individual mass or charge from a supply of molten glass, and means to introduce said separated charge into the mold through said lower open end thereof, said means comprising a passageway into which the separated charge is dropped and through which it moves to the mold.

2. The combination of a mold open at its lower end, means to supply formed charges of molten glass, and guiding means along which each charge moves and is guided from a downward to an upward direction of movement and caused to enter the mold through the lower end thereof, said guiding means having a fixed relation to the mold during said movement of the charge.

3. The combination of a mold, means for supplying formed individual charges of molten glass, means providing a passageway, and means for periodically causing movement of separate individual charges through the passageway, the latter arranged to direct each charge from the feeder into the mold through the lower end of the mold, said passageway having a fixed position relatively to the mold during said movement of the charges.

4. The combination of means to separate a charge of glass from a supply and discharge the separated charge downward, a mold, and means to transfer said charge and cause it to enter the mold in an upward direction, said transfer means comprising a guide along which the charge moves and by which it is directed from a downward to an upward direction of movement, said guide having a fixed position relatively to the mold during said movement of the charge therealong.

5. The combination of a mold, means to separate from a molten supply a mass of glass sufficient for a mold charge and discharge it downward, and means to transfer the separated mass by a continuous movement from the point of discharge to the mold and cause it to enter the mold in an upward direction.

6. The combination of a mold open at its lower end, a feeder from which individual formed charges of glass are supplied and dropped by gravity, and stationary guiding means to receive the charges as they drop and direct them into said open end of the mold.

7. The combination of a mold open at its lower end, a feeder from which individual charges of glass are supplied and dropped by gravity, and means to maintain a continuous movement of each charge from the feeder into the mold through said lower open end.

8. The combination of a traveling mold open at its lower end to receive a charge of glass, a stationary feeder, and means to direct individual masses of glass from the feeder into said open end of the mold while the latter is traveling.

9. The combination of a traveling mold open at its lower end to receive a charge, means to supply individual segregated masses of glass, and means to direct said masses into the mold through said lower open end while the mold is traveling.

10. The combination of a mold open at its lower end, a guide having a passageway through which charges of glass are directed to the mold, said guide comprising an upwardly directed end to receive the charges, and an upwardly directed end to deliver the charges to the mold, said guide providing a continuous passageway from the receiving end to the delivery end thereof, the delivery end of said guide being in register with said open end of the mold and of substantially the same cross sectional area and shape as the mold cavity.

11. The combination of a mold open at its lower end, a guide having a passageway through which charges of glass are directed to the mold, said guide comprising an upwardly directed end to receive the charges, and an upwardly directed end to deliver the charges to the mold, said last mentioned end being in register with the lower end of the mold and having an air tight connection therewith, the delivery end of the guide being of substantially the same cross sectional area and shape as the mold cavity.

12. The combination of a mold open at its lower end, and a funnel guide having an upwardly directed end to receive a charge of glass and an upwardly directed delivery end in register with the said open end of the mold, the delivery end of the guide being of substantially the same cross sectional area and shape as the mold cavity.

13. The combination of a mold open at its lower end to receive a charge, a funnel guide having an upwardly directed charge receiving end and an upwardly directed delivery end, and automatic means to move said delivery end of the guide into and out of registry with the receiving end of the mold.

14. The combination with means to produce a formed charge of plastic glass and separate it from a molten supply body, of a mold open at its lower end to receive the charge, a guide positioned to direct the charge of glass after it is formed and separated, to the mold and through said open end, and automatic means to swing said guide laterally to and from said position.

15. The combination of a mold open at its lower end to receive a charge, a guide by which charges of glass are directed to the mold and through said open end, and automatic means to move said guide vertically and laterally to and from a position in which it registers with the mold.

16. The combination of a mold having a substantially cylindrical mold cavity, a funnel guide in register therewith, said guide having a U-shaped passageway leading to the mold, and means to exhaust air from said passageway, the end of said guide at the mold being substantially the same cross sectional area and shape as the mold cavity.

17. The combination of a feeder from which individual masses or gobs of molten glass are supplied, a hollow transfer device through which the charges are conveyed, said device having upwardly directed receiving and delivering ends and being sufficiently restricted in cross sectional area for a portion of its length to be sealed by the glass during its passage, and means to exhaust the air from the passage in advance of the glass.

18. The combination of a mold open at its lower end, means for supplying individual severed charges of molten glass, means for conveying each charge en masse to and completely within the mold, comprising a passageway extending downwardly and thence upwardly to the lower end of the mold, through which passageway the mass passes, and means for exhausting air from the passageway and mold, causing delivery of the charge upwardly into the mold through said open lower end.

19. The combination of a mold open at its lower end, means for supplying individual severed charges of molten glass, means for conveying each charge en masse to and completely within the mold comprising a passageway extending downwardly and thence upwardly to the lower end of the mold, through which passageway the mass passes, and means to produce differential pressure on opposite sides of the charge of glass by which the latter is forced bodily upward into the mold through said open lower end.

Signed at Toledo, in the county of Lucas and State of Ohio, this 7th day of April, 1922.

LEONARD D. SOUBIER.